United States Patent
Takasaka et al.

(10) Patent No.: US 8,085,427 B2
(45) Date of Patent: Dec. 27, 2011

(54) IMAGE PROCESSING METHOD AND APPARATUS

(75) Inventors: Michiaki Takasaka, Kawasaki (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 995 days.

(21) Appl. No.: 12/026,587

(22) Filed: Feb. 6, 2008

(65) Prior Publication Data

US 2008/0186541 A1    Aug. 7, 2008

(30) Foreign Application Priority Data

Feb. 6, 2007   (JP) ................. 2007-027371

(51) Int. Cl.
*G06K 1/00* (2006.01)
(52) U.S. Cl. .................... 358/1.17; 358/1.16
(58) Field of Classification Search ............. 358/1.17
See application file for complete search history.

(56) References Cited

U.S. PATENT DOCUMENTS

| | | | | |
|---|---|---|---|---|
| 4,903,123 A * | 2/1990 | Kawamura et al. | ........... | 358/533 |
| 5,115,241 A | 5/1992 | Ishikawa | ............. | 341/143 |
| 5,245,701 A * | 9/1993 | Matsumoto | .............. | 345/619 |
| 5,436,981 A | 7/1995 | Ishikawa | .............. | 382/173 |
| 5,502,555 A * | 3/1996 | Lakatos | .............. | 399/140 |
| 6,084,984 A | 7/2000 | Ishikawa | .............. | 382/173 |
| 6,950,559 B2 | 9/2005 | Kobayashi | .............. | 382/260 |
| 2004/0196408 A1 | 10/2004 | Ishikawa et al. | ........... | 348/616 |
| 2005/0025374 A1 | 2/2005 | Ishikawa et al. | .............. | 382/252 |
| 2006/0228035 A1 | 10/2006 | Ishikawa | .............. | 382/252 |

FOREIGN PATENT DOCUMENTS

JP    06006548 A * 1/1994

* cited by examiner

*Primary Examiner* — King Poon
*Assistant Examiner* — Allen H Nguyen
(74) *Attorney, Agent, or Firm* — Fitzpatrick, Cella, Harper & Scinto

(57) ABSTRACT

An image processing apparatus stores, in a buffer, an image data of c bits in the main scanning direction and y lines in the sub scanning direction, and reads out a pixel data of p bits that configures the image data stored in the buffer, in accordance with the completion of the storage of the image data. Note that c is a common multiple of m, which is the number of bits in the unit of memory access, and p, which is the number of bits in a single pixel. Note further that the number of bits in the unit of memory access m is not itself a multiple of the number of bits in a single pixel p.

12 Claims, 10 Drawing Sheets

FIG. 3
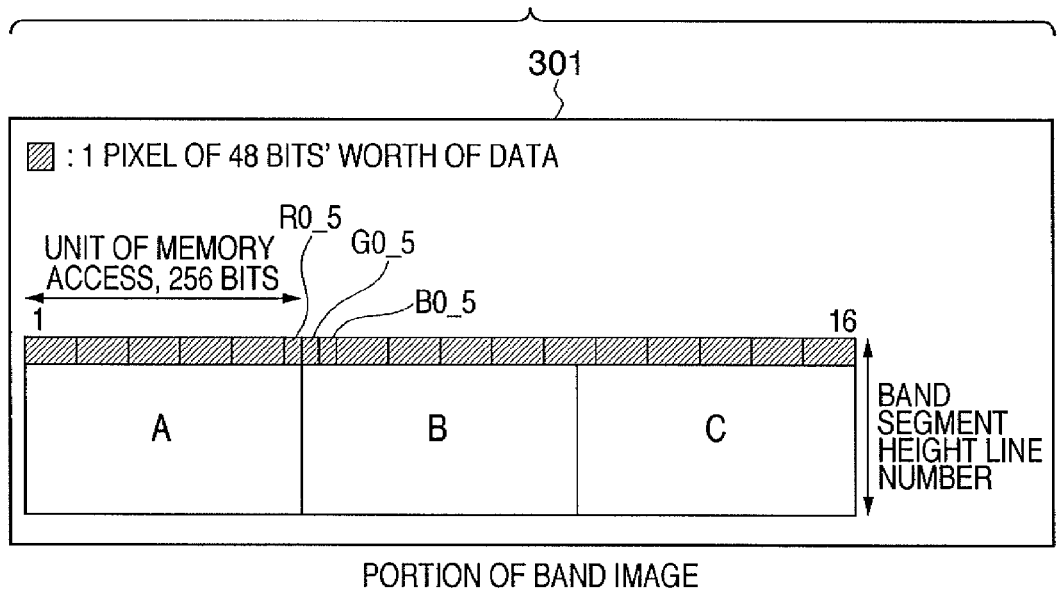
PORTION OF BAND IMAGE
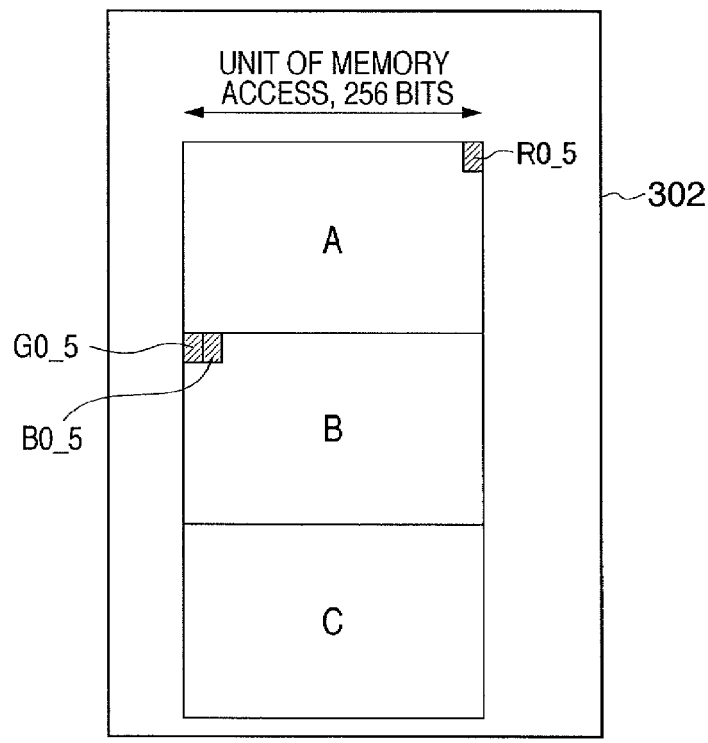
IMAGE DATA THAT IS STORED IN BUFFER FIG. 6  DIAGRAM OF BUFFER STORAGE OF 8-BIT RGB IMAGE DATA, WHEREIN 32 COLUMNS' WORTH OF DATA IS STORED

FIG. 9

| | +00 | +02 | +04 | +06 | +08 | +0A | +0C | +0E | +10 | +12 | +14 | +16 | +18 | +1A | +1C | +1E |
|---|---|---|---|---|---|---|---|---|---|---|---|---|---|---|---|---|
| | FIRST COLUMN | | | SECOND COLUMN | | | THIRD COLUMN | | | FOURTH COLUMN | | | FIFTH COLUMN | | | SIXTH COLUMN |
| 0x0000 | R00_00 | G00_00 | B00_00 | R00_01 | G00_01 | B00_01 | R00_02 | G00_02 | B00_02 | R00_03 | G00_03 | B00_03 | R00_04 | G00_04 | B00_04 | R00_05 |
| 0x0020 | R01_00 | G01_00 | B01_00 | R01_01 | G01_01 | B01_01 | R01_02 | G01_02 | B01_02 | R01_03 | G01_03 | B01_03 | R01_04 | G01_04 | B01_04 | R01_05 |
| ⋮ | ⋮ | | | | | | | | | | | | | | | ⋮ |
| 0x02E0 | R23_00 | G23_00 | B23_00 | R23_01 | G23_01 | B23_01 | R23_02 | G23_02 | B23_02 | R23_03 | G23_03 | B23_03 | R23_04 | G23_04 | B23_04 | R23_05 |

FIG. 10

| | SIXTH COLUMN | | SEVENTH COLUMN | | EIGHTH COLUMN | | NINTH COLUMN | | TENTH COLUMN | | ELEVENTH COLUMN |
|---|---|---|---|---|---|---|---|---|---|---|---|
| 0x0000 | G00_05 | B00_05 | R00_06 | G00_06 | B00_06 | R00_07 | G00_07 | B00_07 | R00_08 | G00_08 | B00_08 | R00_09 | G00_09 | B00_09 | R00_10 |
| 0x0020 | G01_05 | B01_05 | R01_06 | G01_06 | B01_06 | R01_07 | G01_07 | B01_07 | R01_08 | G01_08 | B01_08 | R01_09 | G01_09 | B01_09 | R01_10 |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 0x02E0 | G23_05 | B23_05 | R23_06 | G23_06 | B23_06 | R23_07 | G23_07 | B23_07 | R23_08 | G23_08 | B23_08 | R23_09 | G23_09 | B23_09 | R23_10 |

IMAGE PROCESSING METHOD AND APPARATUS

BACKGROUND OF THE INVENTION

1. Field of the Invention

The present invention relates to an image processing method and apparatus that read out an image data in a sub scanning direction stored in a buffer.

2. Description of the Related Art

An apparatus that performs a copy by controlling a scanner and a printer in an integrated fashion comprises an image processing unit that converts an image data read out by the scanner into an image data optimized for printing. The image processing unit comprises a buffer, which typically stores a plurality of lines of an image data to be processed, as a configuration element for performing an image process that references a pixel in a periphery, such as a filter process. As the size of the image data increases, however, a line size buffered also increases commensurately, and it has thus been necessary to remake the image processing unit whenever the size of the image data increases.

A method has accordingly been disclosed that segments the image data to be processed into a specified unit, or a band, in a sub scanning direction, performs a scan conversion, i.e., an H-V conversion, on a per band basis, and conveys the result thereof to the image processing unit at a subsequent stage; see, for example, U.S. Pat. No. 6,950,559. The method is referred to as a cross-band protocol. Employing the cross-band protocol allows employing a buffer of a limited size, which is not dependent upon the line size, in processing an image data of an arbitrary size.

Conversely, the image processing unit comprises an internal buffer for the scan conversion, the buffer being configured, with an eye toward cost and efficiency of data transfer, of a double buffer, with each of two buffers of a number of lines of a band multiplied by a unit of memory access.

A problem such as the following arises, however, when performing a scan conversion with the double buffer based on the unit of memory access.

For example, if a single pixel is stored in the memory without a break in 24 bits, with a 128-bit unit of memory access, a boundary of the memory access and a boundary of the pixel are by no means guaranteed to match, which may result in a pixel that overruns the buffer. Nor is a volume of data in a single line guaranteed to match the unit of memory access, which may result in a head of each respective line not lining up regularly with the head of each respective other line, making the scan conversion very difficult.

A similar problem arises as well with an image data stored in an RGB dot sequential format. FIG. 8 depicts a state of storing, in a buffer, an RGB dot sequential format image with a 48-bit pixel size, i.e., 16 bits each R, G, and B. As depicted in FIG. 8, the RGB dot sequential format image is stored in a buffer in a 256-bit unit of memory access as a band image segmented into a band with a height of 24 lines.

FIG. 9 depicts a storage state of a segment image A with a 256-bit width that is the unit of memory access depicted in FIG. 8. FIG. 10 depicts a storage state of a segment image B with a 256-bit width that is the unit of memory access depicted in FIG. 8. In the present example, the quantity of data of a single line is treated as being the unit of memory access, i.e., 256 bits, and a green data G00_05-G23_05 and a blue data B00_05-B23_05 in a column six are contained within a second buffer, as depicted in FIG. 10.

It is necessary, however, for the green data and the blue data to be processed together with a red data R00_05-R23_05 contained within a first buffer, as depicted in FIG. 9. It is thus necessary to maintain the red data within such as an internal register of a size equal to a number of inputted lines, when acquiring the data of the first buffer.

Thus, the problem when scan converting a dot sequential image is that it is necessary to a) manage either the color that the data of the head column in the buffer starts with, or the color that the data of the last column ends with, and b) maintain the pixel data that overruns the buffer.

Another problem is that it is necessary to configure and remake the dot sequential image into either a line sequential image or a frame sequential image, and to create a further wasteful increase in accessing and buffering thereof.

SUMMARY OF THE INVENTION

An objective of the present invention is to provide an image processing method and apparatus that efficiently converts a scan direction.

An objective of the present invention is to provide an image processing method of storing an image data in a buffer of a prescribed bit quantity in a main scanning direction and a prescribed line quantity in a sub scanning direction, wherein an image data is stored in the buffer that is c bits in the main scanning direction, where c is a common multiple of a number of bits of a unit of memory access m and a number of bits in a single pixel p, and the number of bits of the unit of memory access m is not itself a multiple of the number of bits in the single pixel p, and y lines in the sub scanning direction, and that reads out a pixel data of p bits, which configures an image data stored in the buffer, in response to completing the storage, i.e., the buffering, of the image data of c bits in the main scanning direction and y lines in the sub scanning direction.

An objective of the present invention is to provide an image processing apparatus that comprises a storage unit that stores an image data in a buffer of a prescribed bit quantity in a main scanning direction and a prescribed line quantity in a sub scanning direction, wherein an image data is stored in the buffer that is c bits in the main scanning direction, where c is a common multiple of a number of bits of a unit of memory access m and a number of bits in a single pixel p, and the number of bits of the unit of memory access m is not itself a multiple of the number of bits in the single pixel p, and y lines in the sub scanning direction, and a readout unit that reads out a pixel data of p bits, which configures an image data stored in the buffer, in response to completing the storage, i.e., the buffering, of the image data of c bits in the main scanning direction and y lines in the sub scanning direction.

Further features of the present invention will become apparent from the following description of exemplary embodiments (with reference to the attached drawings).

BRIEF DESCRIPTION OF THE DRAWINGS

FIG. 3 describes a process of an image data storage unit 102 depicted in FIG. 1.

FIG. 9 depicts a storage state of a segment image A with a 256-bit width that is a unit of memory access depicted in FIG. 8.

FIG. 10 depicts a storage state of a segment image B with a 256-bit width that is a unit of memory access depicted in FIG. 8.

DESCRIPTION OF THE EMBODIMENTS

Following is a detailed description of preferred embodiments of the present invention, with reference to the attached drawings.

Figure 1:
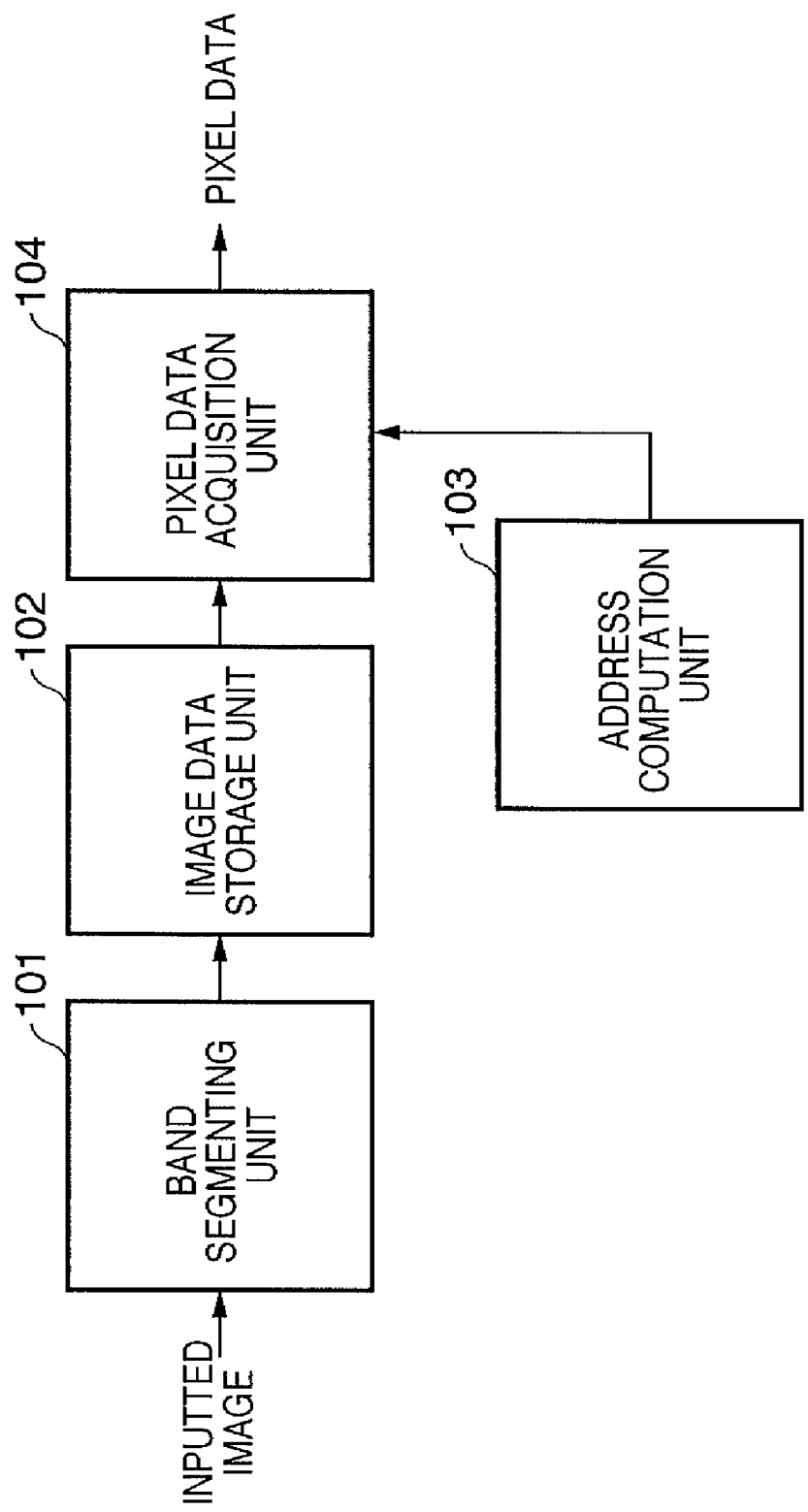
FIG. 1 depicts an example of a configuration of a scan conversion apparatus according to the embodiment.

FIG. 1 depicts an example of a configuration of a scan conversion apparatus according to the embodiment. As depicted in FIG. 1, the scan conversion apparatus is comprised of a band segmenting unit 101, an image data storage unit 102, an address computation unit 103, and a pixel data acquisition unit 104.

Figure 2:
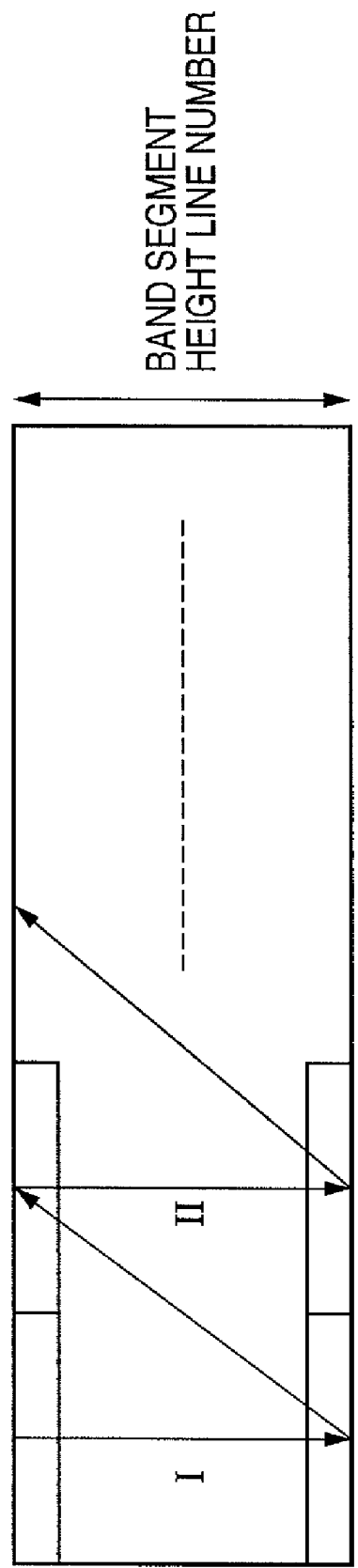
FIG. 2 describes a process of a band segmenting unit 101 depicted in FIG. 1.

In the present circumstance, the band segmenting unit 101 segments an inputted image into a band image of a prescribed height, i.e., a band unit, and transfers the image in order in a sub scanning direction, at a prescribed memory access width, as depicted in FIG. 2. The image data storage unit 102 stores a prescribed number of lines, in order from the top of the buffer, of an image data in a dot sequential format transferred from the band segmenting unit 101 in the unit of the memory access.

The image data storage unit 102 is comprised of a double buffer, which incorporates a first buffer and a second buffer, in order to efficiently perform the data transfer. While the image data inputted into the first buffer is being stored, an acquisition and outputting of the image data from the second buffer is performed, and conversely, while the image data inputted into the second buffer is being stored, an acquisition and outputting of the image data from the first buffer is performed.

The address computation unit 103 computationally derives a readout address when the pixel data acquisition unit 104 acquires the image data from the image data storage unit 102. A description relating to the computation of the readout address will be given hereinafter. After a prescribed data is stored in the buffer of the image data storage unit 102, the pixel data acquisition unit 104 acquires the pixel data from the buffer, in accordance with the address acquired from the address computation unit 103.

Following is a detailed description relating to a process of storing the image data in the buffer of the image data storage unit 102. While the following description presumes, for example, a unit of memory access of 256 bits, and a pixel configuration of 48 bits and three colors, RGB, hereinafter referred to as "16-bit RGB dot sequential," neither the unit of memory access nor the number of bits per pixel are restricted in any particular fashion.

Presuming, in the present circumstance, that the buffer width is 768, which is a common multiple of the unit of memory access of 256 bits and the 48 bits per pixel, then a pixel data of 16 pixels in the main scanning direction is stored in the buffer, such as is depicted in FIG. 3, reference numeral 301. Accordingly, a segment image data A-C is stored in the first buffer, no pixel is stored such that the pixel overruns the first buffer and the second buffer, and a head of each respective line also lines up consistently with each other respective line.

In such a circumstance, it would be permissible for the band segmenting unit 101 depicted in FIG. 1 to repeat a transfer of a fixed number of bits of the unit of memory access on a per band height unit basis, regardless of how the internal buffer of the image data storage unit 102 may be allocated with regard to the image data. Accordingly, it is possible to configure the band segmenting unit 101 so as to perform a given processing, irrespective of a relation between the number of bits and the unit of memory access.

Following is a detailed description relating to a process that reads out the pixel data from the buffer on a pixel unit basis in the sub scanning direction.

An example 302 depicted in FIG. 3 is a conceptual diagram of a buffer wherein is stored the 16 pixels of the pixel data in the main scanning direction. It is presumed in the example 302 that a single pixel has 24 bits of data, and is comprised of eight bits each of R, G, and B.

The buffer that stores the pixel data is understood to possess a buffer width that corresponds to a common multiple c of the a number of memory access bits per access m and number of bits of data that configure one pixel p, such as is conceptually depicted in FIG. 3, reference numeral 301. In reality, however, changing a memory handling method in such a manner, in response to a number of data bits in one pixel of an image data will require including an address calculation process on a per image data format basis, making the processing increasingly complicated as a result.

Thus, according to the embodiment, a real address is treated as a memory presumed to have a horizontal width that is a number of bits that configure a single unit of memory access, such as per FIG. 3, reference numeral 302, even while taking to be understood the pixel storage method such as is depicted conceptually in FIG. 3, reference numeral 301. Doing so allows simplifying the address calculation method.

When treating the memory such as the reference numeral 302 depicted in FIG. 3, it is apparent that no contiguous address exists in the RGB data with regard to a border between a segment image data A and a segment image data B. For example, while R0_5, G0_5, and B0_5 are a data of a common pixel, the address thereof is not contiguous, making it difficult to work with the data using conventional scan conversion processing.

Consequently, a determination is made as to the border between the segment image data and the segment image data B and an acquisition color, an operation performed such as adding a prescribed offset value, and a data acquisition address computed. According to the embodiment, it is possible to compute the address without having to take the border of the segment image data into account, by embedding an offset value ADR_OFFSET, to be described hereinafter, from one color data to a next color data with regard to the border of the segment image data. Following is a detailed description of the address computation method.

Hereinafter, "[ ]" denotes a coordinate of a bit whereupon a computation is to be performed. For example, a coordinate of "Z[2:6]" denotes that the bit whereupon the computation is to be performed is a range from a second bit to a sixth bit. A coordinate of "Z[1:0] & '0'" refers to appending "0" after a zeroth bit of a variable Z. For example, "Z=3" is represented in binary as "11," and thus, "W=Z[1:0] & '0'" appending a "0" to the "11" that are the values of the zeroth bit and the first bit, respectively, results in "110," giving W a value of 6 as a result.

$$ADR\_X[6:0]=(X[5:0])+color\_count[1:0] \qquad (1)$$

$$Y\_OFFSET[7:0]=line\_in\_num[4:0] \times ADR\_X[6:5] \qquad (2)$$

$$RAM\_ADR[11:0]=(Y\_OFFSET[7:0]+Y[4:0]) \,\&\, ADR\_X[4:0] \qquad (3)$$

In the present circumstance, "X" is a horizontal direction output counter, which is incremented by a number of addresses per count that are occupied by the data of a single pixel, i.e., the counter "X" is incremented for each respective color within the pixel. For example, if a memory is installed with eight bits per address, and a data is stored and processed therein of one pixel being 24 bits of data, which is comprised of eight bits each of R, G, and B, then X is incremented by 3 for each such pixel.

"Y" is a vertical direction output counter, and "color_count" is a counter of a number of colors that are outputted. "Y_OFFSET" is an offset value for the border of the segmented image data to a next color data in a sequence thereof. "line_in_num" is a number of input lines that have been set. "ADR_X" is a variable that maintains a value that is a product of the horizontal direction output counter times the counter of the number of colors that are outputted. RAM_ADR is an address accessed when acquiring the RGB data.

The equations 1-3 calculate a universal address, provided that a) one pixel is comprised of three data elements, such as RGB or YCbCr, and b) that the memory that stores the pixel data is configured such that a number of bits that is a power of two is assigned to a single address therein. A simple shift of the RAM_ADR thus derived in response to how many bits per address of the memory allows obtaining the address that fits the memory installation.

For example, when one pixel is comprised of three data elements of 16 bits each of R, G, and B, and the memory is installed with eight bits per address, the address may be derived via the following formula:

$$RAM\_ADR16[12:0] = RAM\_ADR[11:0] \, \& \, '0'$$

Following is a description of a scan conversion method when processing a dot sequential image data format wherein one pixel is comprised of 16 bits each of R, G, and B.

Following is a description of a process of storing the band image data in the buffer. The description that follows presumes that a DMA controller transfers a prescribed band image in order, in units of memory access of 256 bits. Given that the lowest common multiple of the unit of memory access of 256 bits and the single pixel bit quantity of 48 bits is 768 bits, the buffer stores 768/48=16 pixels' worth of the pixel data in the main scanning direction. Consequently, the image data storage unit 102 increments a stored line counter by one each time that a data of three 256-bit units is stored, when acquiring the image data in 256-bit units. The 16 pixels worth of the pixel data in the main scanning direction is stored in the buffer while such a process as the foregoing is being performed.

Figure 4:
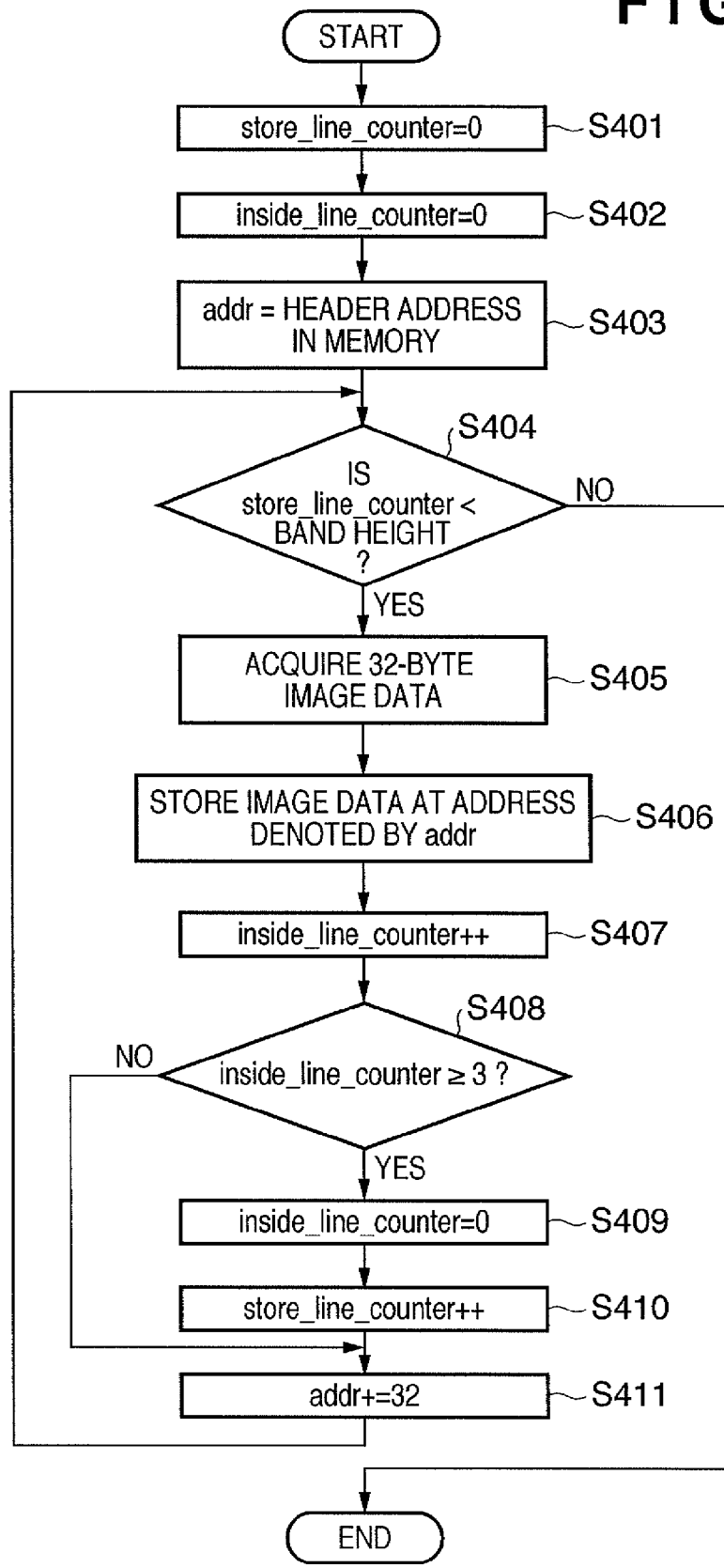
FIG. 4 is a flowchart that depicts a process that stores an image data in a buffer according to the embodiment.

FIG. 4 is a flowchart that depicts a process that stores an image data in a buffer according to the embodiment. In step S401, a counter "store_line_counter" of a stored line is initialized to zero. In step S402, a counter "inside_line_counter" of an inside line is reset to zero. In step S403, a memory header address is assigned to an "addr," which denotes an address wherein the image is stored.

In step S404, a determination is made as to whether or not the store_line_counter is less than the set number of band segment height lines. In the present circumstance, the process terminates if the store_line_counter is greater than or equal to the number of band segment height lines.

If the store_line_counter is less than the set number of band segment height lines, the process proceeds to step S405, wherein a 32-byte, i.e., a 256-bit, image data is acquired. In step S406, the acquired image data is stored at the address denoted by the addr. In step S407, the inside_line_counter is incremented by one. In step S408, a determination is made as to whether or not the inside_line_counter is three or more, and if it is determined that the inside_line_counter is three or more, the process proceeds to step S409, wherein the inside line counter is reset to zero.

In the present circumstance, the value of three employed as a determination condition is the value of the number of elements that are lined up in the buffer, which is treated as the prerequisite according to the embodiment, i.e, c/m=768/256=3. Accordingly, the store_line_counter is incremented by one every time the three line data is stored in the buffer, where one line is 256 bits. Accordingly, the storage in the buffer 302 in FIG. 3 is completed when the value of the store_line_counter reaches the number of band segment height lines.

In step S410, the store_line_counter is incremented by one, and the process proceeds to step S411. If the inside_line_counter is less than three in step S408, the process proceeds to step S411, wherein the 32 bytes, i.e., the 256 bits, which is the unit of memory access, are added to the addr, whereupon the process returns to step S404.

When the storage of the image data in the first buffer of the double buffer that is the image data storage unit 102 is finished, the result of step S404 becomes "NO." Thereafter, a similar process is performed for the second buffer of the image data storage unit 102 to store the image data therein.

Figure 5:
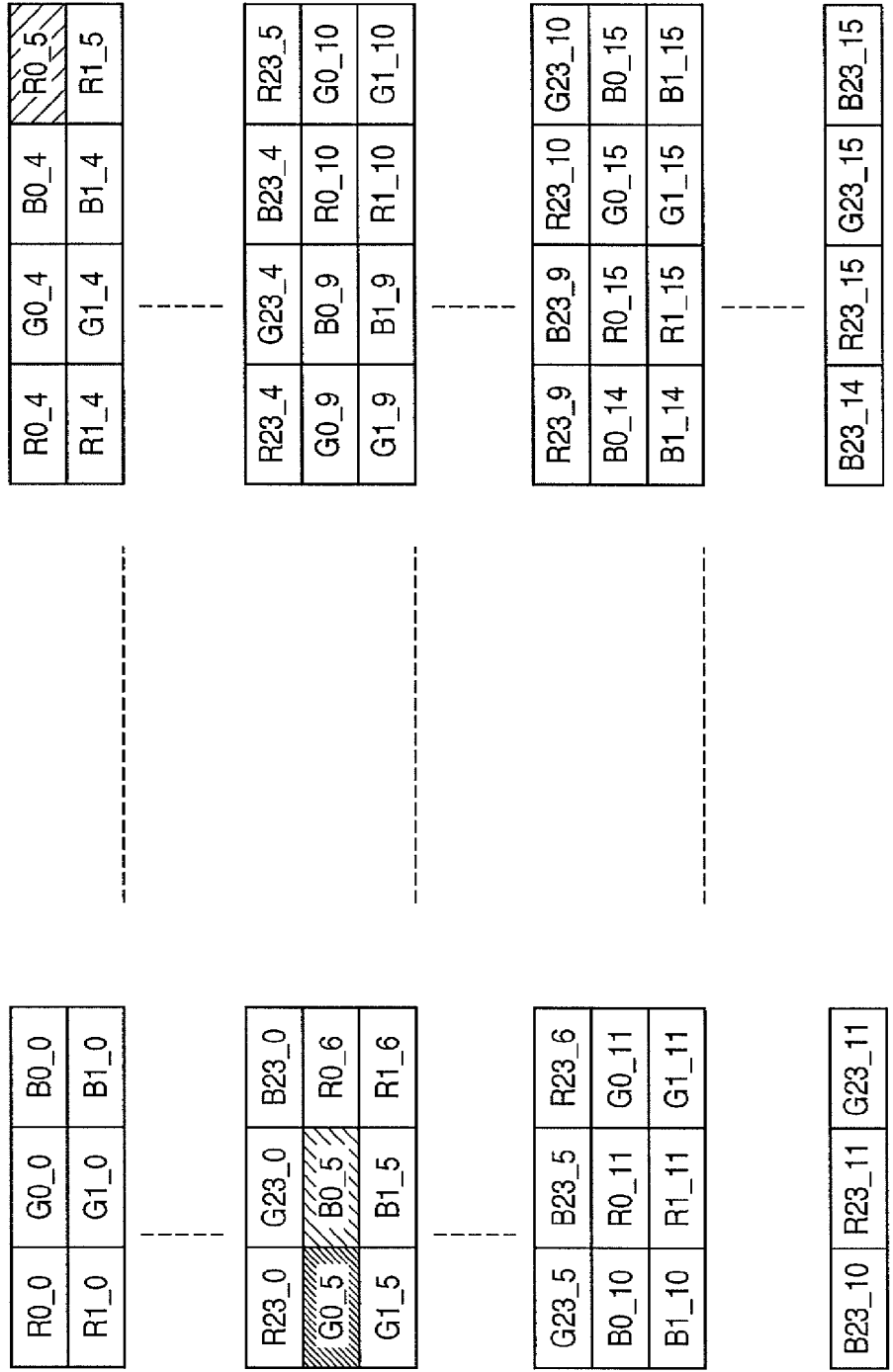
FIG. 5 depicts a state wherein a 16-bit RGB dot sequential image is stored in the buffer.

Per the foregoing process, the image data is stored in the buffer such as is depicted in FIG. 5, when the image is a 16-bit RGB dot sequential image. 16 columns' worth of data is stored therein. FIG. 5 corresponds to FIG. 3, reference numeral 302.

Figure 6:
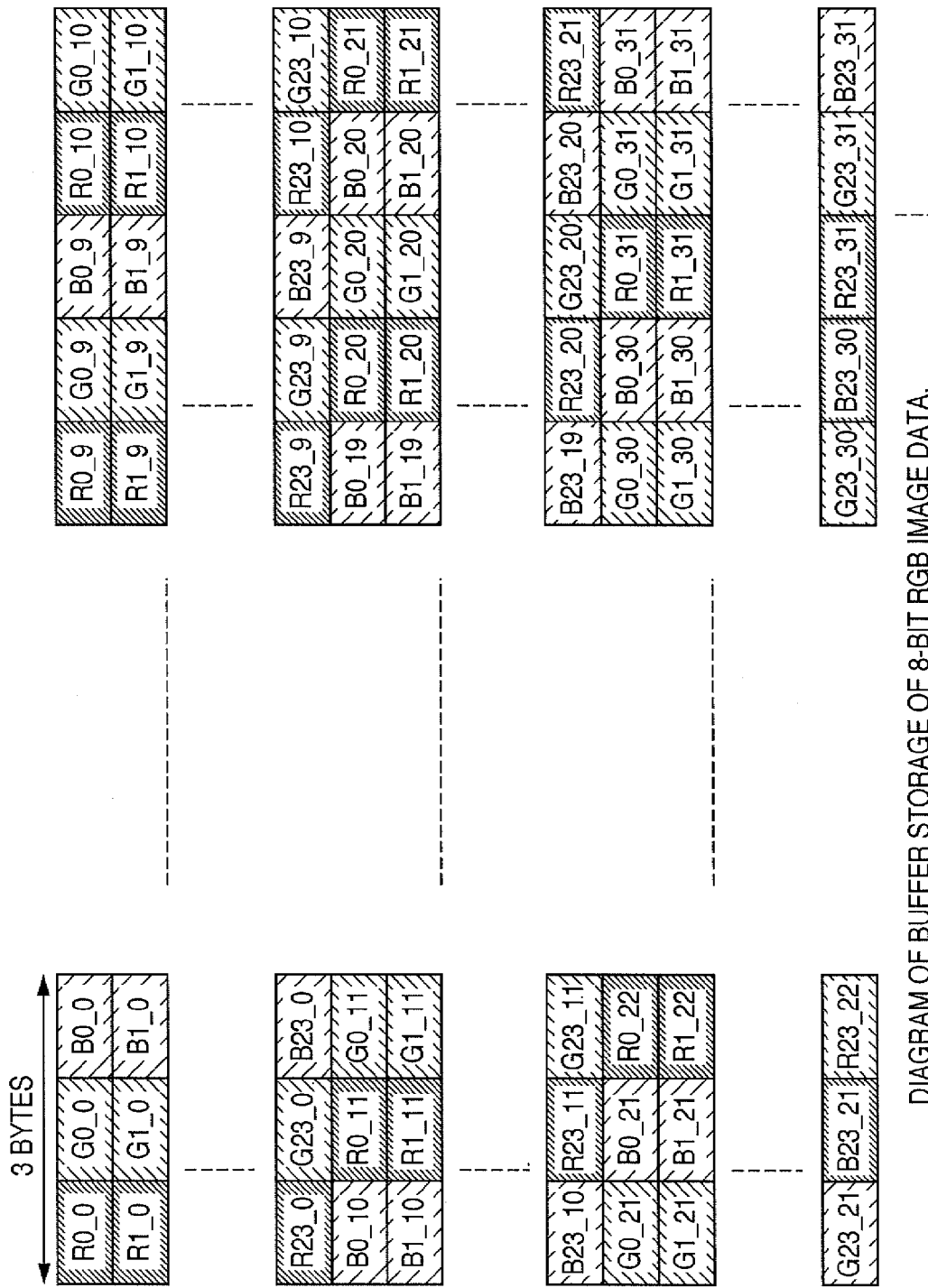
FIG. 6 depicts a state wherein an 8-bit RGB dot sequential image is stored in the buffer.

When the image is an 8-bit RGB dot sequential image, the image data is stored in the buffer such as is depicted in FIG. 6. 32 columns' worth of data is stored therein.

Accordingly, no RGB data is stored that overruns the border between the first buffer and the second buffer.

Following is a description of a process of acquiring the pixel data from the buffer. The pixel data acquisition unit 104 performs a scan conversion in the sub scanning direction, and acquires the pixel data thereby.

Figure 7:
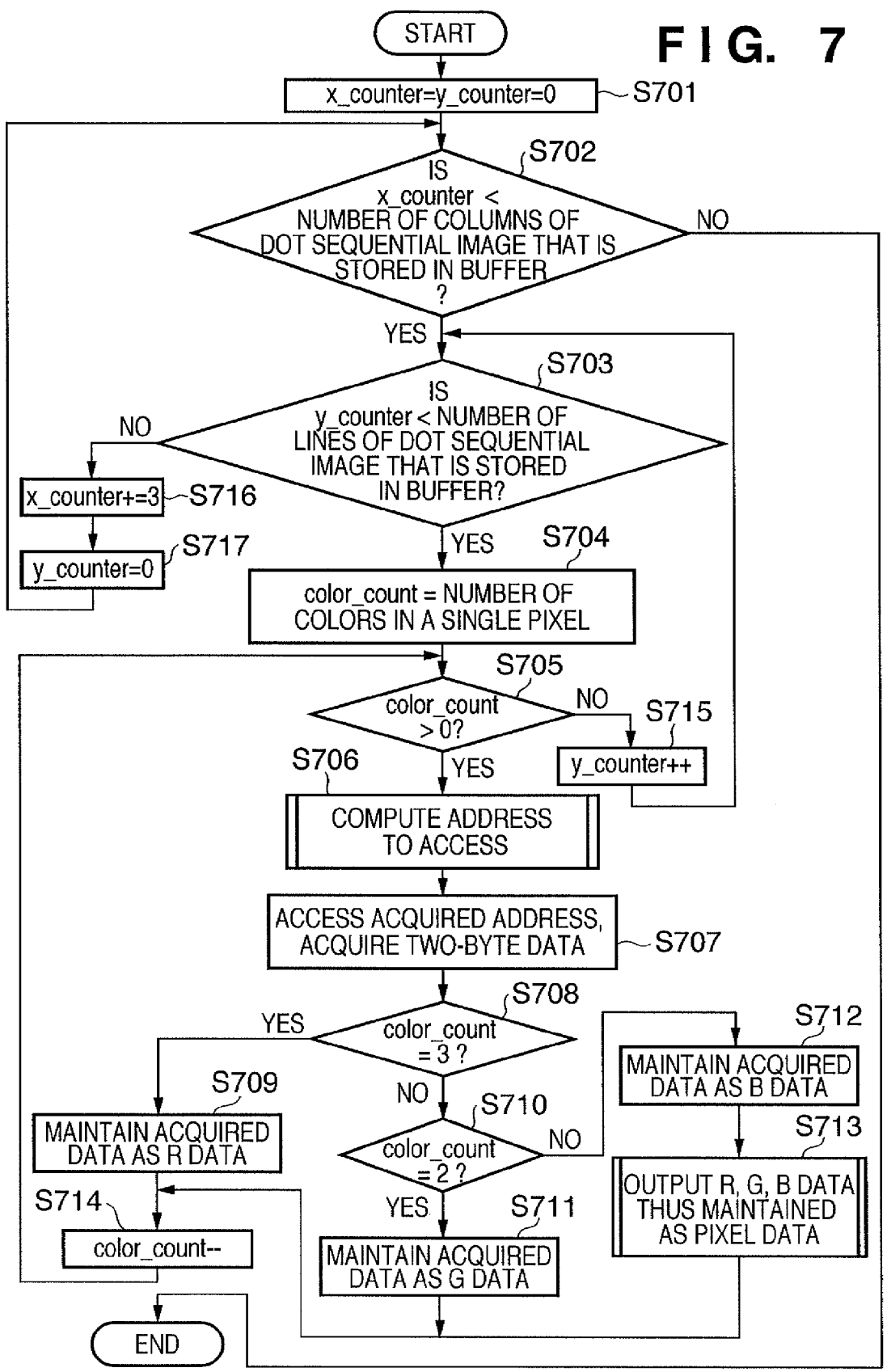
FIG. 7 is a flowchart that depicts a process of a pixel data acquisition unit 104, according to the embodiment.
Figure 8:
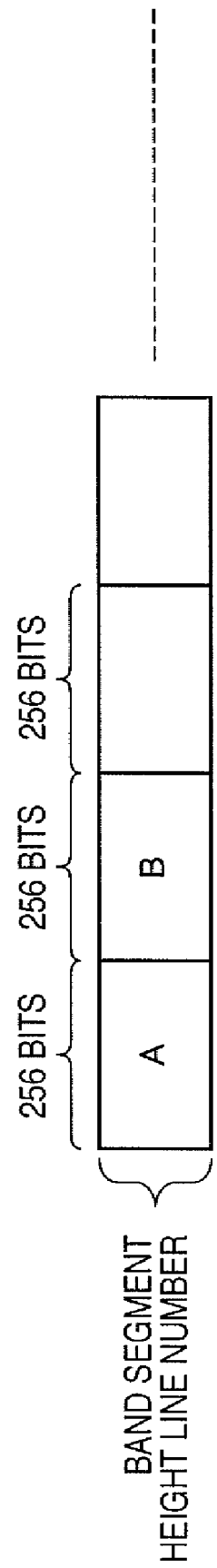
FIG. 8 depicts a state wherein a 48-bit RGB dot sequential format image, i.e., 16 bits each of R, G, and B, is stored in the buffer.

FIG. 7 is a flowchart that depicts the process of the pixel data acquisition unit 104, according to the embodiment. In the present circumstance, the description cites an example of working with the dot sequential image data of either the 16-bit RGB or the 8-bit RGB. It would also be possible to process the image data as a monochrome image, by treating the number of colors per pixel as 1.

In step S701, an "x_counter" that counts a number of outputted columns, and a "y_counter" that counts a number of outputted lines, are initialized to zero. In step S702, a determination is made as to whether or not the x_counter is less than a number of columns of the dot sequential image stored in the memory. In the example depicted in FIG. 3, the number of columns is the data of the three colors R, G, and B, i.e., 16×3=48 columns. If the x_counter is less than the number of columns of the dot sequential image, the process proceeds to step S703, whereas the process terminates if the x_counter is greater than or equal to the number of columns of the dot sequential image.

In step S703, a determination is made as to whether or not the y_counter is less than a number of band height lines. If the y_counter is less than the number of band height lines, the process proceeds to step S704, whereas if the y_counter is greater than or equal to the number of band height lines, the process proceeds to step S716.

In step S704, a "color_count" that counts a number of outputted colors in order is initialized that a number of colors in a single pixel. In step S705, a determination is made as to whether or not the color_count is greater than zero. If the color count is greater than zero, the process proceeds to step S706, whereas if the color_count is less than or equal to zero, the process proceeds to step S715.

In step S706, the address computation equations 1-3 are employed to derive an address in memory that is accessed in order to acquire the pixel data. In step S707, the acquired address is accessed and one color's worth of data is acquired. When the data is acquired, two bytes are acquired if the 16-bit RGB point data is being worked with, whereas one byte is acquired if the 8-bit RGB point data is being worked with.

In step S708, a determination is made as to whether or not the color_count is three, and if the color_count is three, the process proceeds to step S709, whereas if the color_count is not three, the process proceeds to step S710.

In step S709, the acquired data is maintained as an R data, and the process proceeds to step S714. In step S710, a determination is made as to whether or not the color_count is two, and if the color_count is two, the process proceeds to step S711, whereas if the color_count is not two, the process proceeds to step S712.

In step S711, the acquired data is maintained as a G data, and the process proceeds to step S714. In step S712, the acquired data is maintained as a B data. In step S713, the maintained RGB data is outputted as a pixel data.

In step S714, the color_count is incremented by one, whereupon the process returns to step S705 and repeats the preceding steps.

If the determination in step S705 is "NO," then the y_counter is incremented by one in step S715, whereupon the process returns to step S703 and repeats the preceding steps.

If the determination in step S703 is "NO," then the x_counter is incremented by three in step S716. In step S717, the y_counter is initialized to zero, whereupon the process returns to step S702 and repeats the preceding steps.

According to the embodiment, setting the buffer in accordance with the common multiple of the number of bits of the unit of memory access and the number of bits of a single pixel eliminates the storage of a pixel that overruns the first buffer and the second buffer.

Variant Embodiments

Whereas the type of the colors, i.e., the color space, was presumed to be the three colors RGB according to the embodiment, it would be permissible for the color space to be the three colors YCbCr. The present invention does not specify a particular type of color, i.e., no particular color space.

A basic form of the equations 1-3 that are employed in computing the address are the following equations 4-6, and the bit allocation and the number of bits of each respective variable referenced with regard to the equations 4-6 varies according to the unit of memory access or the number of colors that are being worked with. It is possible, however, to deal with the situation by setting an appropriate bit allocation or number of bits according to each respective unit of memory access and the number of colors that are being worked with.

$$ADR\_X = X + color\_count \quad (4)$$

$$Y\_OFFSET = line\_in\_num \times ADR\_X \quad (5)$$

$$RAM\_ADR = (Y\_OFFSET + Y) \& ADR\_X \quad (6)$$

Whereas the description according to the embodiment cites an example wherein the equations 1-3 have the unit of memory access of 256 bits and work with three colors, it is to be understood that the present invention is not restricted thereto.

For example, if the unit of memory access is 128 bits, the equations 4-6 will be as equations 7-9, as follows:

$$ADR\_X[6:0] = (X[5:0]) + color\_count[1:0] \quad (7)$$

$$Y\_OFFSET[7:0] = line\_in\_num[4:0] \times ADR\_X[6:4] \quad (8)$$

$$RAM\_ADR[11:0] = (Y\_OFFSET[7:0] + Y[4:0]) \& ADR\_X[3:0] \quad (9)$$

Other Embodiments

The objective of the present invention is also achieved by supplying, to either a system or an apparatus, a recording medium whereupon is recorded a program code of a software that implements a function according to the embodiment, and a computer, i.e., a CPU or an MPU, of the system or the apparatus, loading and executing the program code recorded upon the recording medium. In such a circumstance, the program code itself loaded from the recording medium implements the function according to the embodiment, and the recording medium that records the program code configures the present invention.

As the recording medium for supplying the program code, it would be possible to employ such as a floppy disk, a hard drive, an optical disk, a magneto-optical (MO) disk, a CD-ROM, a CD-R, a magnetic tape, a nonvolatile memory card, a ROM, or a DVD, for example.

Also included are the following circumstances, in addition to the function according to the embodiment being implemented by the computer executing the program code loaded from the recording medium. A circumstance is included wherein an operating system (OS) or other software that is running on the computer performs an actual process, in whole or in part, in accordance with a command of the program code, and the function according to the embodiment is implemented by the process thereof.

Also included is a circumstance wherein the program code loaded from the recording medium is written to a memory comprised in an expansion board inserted into the computer, or an expansion unit attached to the computer. Thereafter, the CPU or other hardware comprised in the expansion board or the expansion unit performs the actual process, in whole or in part, in accordance with the command of the program code, and the function according to the embodiment is implemented by the process thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-027371, filed Feb. 6, 2007, which is hereby incorporated by reference herein in its entirety.

What is claimed is:

1. An image processing method configured to store, in a buffer, an image data of a prescribed bit quantity in a main scanning direction and a prescribed line quantity in a sub scanning direction, and to read out the image data stored in the buffer, the method comprising:

storing, in the buffer, an image data of a quantity of c bits in a main scanning direction, wherein c is a common multiple of a number of bits m of a unit of memory access and a number p of bits in a single pixel, and the number of bits m of the unit of memory access is not a multiple of the number p of bits in the single pixel, and a quantity of y lines in a sub scanning direction; and reading out a pixel data, in the sub scanning direction, of p bits that configure the image data stored in the buffer, in response to a completion of the storage of the image data of the quantity of c bits in the main scanning direction and the quantity of y lines in the sub scanning direction.

2. The image processing method according to claim 1, wherein the storing step repeats, for a number of c/m iterations, the storage process of storing, in the buffer, the image data of m bits in the main scanning direction, in the quantity of y lines.

3. The image processing method according to claim 1, wherein the reading out step reads out, for a number of c/p iterations, the pixel data of p bits that configure the image data stored in the buffer, for every y elements in the sub scanning direction.

4. The image processing method according to claim 1, wherein the storing step repeats the storage process of storing, in the buffer, the image data of every m bits; and wherein the reading out step computes a readout address so as to output the pixel data stored in the buffer by way of the storage process of a portion of a pixel data that configures a single pixel and a remainder that is two iterations of m bits, as a pixel data that configures a single pixel.

5. An image processing apparatus configured to store, in a buffer, an image data of a prescribed bit quantity in a main scanning direction and a prescribed line quantity in a sub scanning direction, and to read out the image data stored in the buffer, the apparatus comprising:

a storage unit configured to store, in the buffer, an image data of a quantity of c bits in a main scanning direction, wherein c is a common multiple of a number of bits m of a unit of memory access and a number p of bits in a single pixel, and the number of bits m of the unit of memory access is not a multiple of the number p of bits in the single pixel, and a quantity of y lines in a sub scanning direction; and a readout unit configured to read out a pixel data, in the sub scanning direction, of p bits that configure the image data stored in the buffer, in response to a completion of the storage of the image data of the quantity of c bits in the main scanning direction and the quantity of y lines in the sub scanning direction.

6. The image processing apparatus according to claim 5, wherein the storage unit repeats, for a number of c/m iterations, the storage process of storing, in the buffer, the image data of m bits in the main scanning direction, in the quantity of y lines.

7. The image processing apparatus according to claim 5, wherein the readout unit reads out, for a number of c/p iterations, the pixel data of p bits that configure the image data stored in the buffer, for every y elements in the sub scanning direction.

8. The image processing apparatus according to claim 5, wherein the storage unit repeats the storage process of storing, in the buffer, the image data of every m bits; and wherein the readout unit computes a readout address so as to output the pixel data, stored in the buffer by way of the storage process of a portion of a pixel data that configures a single pixel and a remainder that is two iterations of m bits, as a pixel data that configures a single pixel.

9. A non-transitory computer readable medium configured to store a computer program configured to execute an image process configured to store, in a buffer, an image data of a prescribed bit quantity in a main scanning direction and a prescribed line quantity in a sub scanning direction, and to read out the image data stored in the buffer, the computer program comprising:

storing, in the buffer, an image data of a quantity of c bits in a main scanning direction, wherein c is a common multiple of a number of bits m of a unit of memory access and a number p of bits in a single pixel, and the number of bits m of the unit of memory access is not a multiple of the number p of bits in the single pixel, and a quantity of y lines in a sub scanning direction; and reading out a pixel data, in the sub scanning direction, of p bits that configure the image data stored in the buffer, in response to a completion of the storage of the image data of the quantity of c bits in the main scanning direction and the quantity of y lines in the sub scanning direction.

10. The non-transitory computer readable medium according to claim 9, wherein the storing step repeats, for a number of c/m iterations, the storage process of storing, in the buffer, the image data of m bits in the main scanning direction, in the quantity of y lines.

11. The non-transitory computer readable medium according to claim 9, wherein the reading out step reads out, for a number of c/p iterations, the pixel data of p bits that configure the image data stored in the buffer, for every y elements in the sub scanning direction.

12. The non-transitory computer readable medium according to claim 9, wherein the storing step repeats the storage process of storing, in the buffer, the image data of every m bits; and wherein the reading out step computes a readout address so as to output the pixel data stored in the buffer by way of the storage process of a portion of a pixel data that configures a single pixel and a remainder that is two iterations of m bits, as a pixel data that configures a single pixel.

* * * * *